United States Patent [19]

Chuiko et al.

[11] 4,121,946
[45] Oct. 24, 1978

[54] METHOD OF PRODUCING AMINATED SILICA COMPOUNDS

[76] Inventors: Alexei Alexeevich Chuiko, Prospekt Nauki 99, kv. 48; Valentin Anatolievich Tertykh, ulitsa Sapernoe pole, 9/21, kv. 40, both of Kiev; Nikolai Vasilievich Khaber, ulitsa Sevastopolskaya, 4, kv. 6, Kalush, Ivano-Frankovskoi oblasti; Elena Alexandrovna Chuiko, Prospekt Nauki, 99, kv. 48, Kiev, all of U.S.S.R.

[21] Appl. No.: 714,265

[22] Filed: Aug. 13, 1976

[51] Int. Cl.$^2$ ............................................. C09C 1/28
[52] U.S. Cl. ........................ 106/308 N; 106/288 B; 106/288 Q; 106/309; 252/428
[58] Field of Search ........... 106/308 N, 288 B, 288 Q; 252/428

[56] References Cited

U.S. PATENT DOCUMENTS

| | | | |
|---|---|---|---|
| 2,578,605 | 12/1951 | Sears et al. | 106/308 N |
| 2,865,882 | 12/1958 | Strassburg | 106/308 N |
| 3,431,231 | 3/1969 | Darcy et al. | 106/308 N |
| 3,837,878 | 9/1974 | Beers | 106/308 N |
| 3,948,676 | 3/1976 | Laufer | 106/308 N |

OTHER PUBLICATIONS

I. E. Neimak et al., Dokl. AN SSSR, Synthesis of Specific Silica Gels by Modifying The Surface thereof, 132, 1960, pp. 1356.
A. A. Chuiko et al., Dokl AN SSSR, Investigation of Interaction Between Monoethanolamine and Silica Surface by II Spectroscopy, vol. 186, pp. 385–388, 1969.

*Primary Examiner*—Patrick Garvin
*Assistant Examiner*—J. V. Howard
*Attorney, Agent, or Firm*—Haseltine, Lake & Waters

[57] ABSTRACT

A method of producing aminated silica compounds, characterized in that starting silica is heated at a temperature of 200°–500° C for several hours in the absence of oxygen and moisture, then cooled down to a temperature of 100°–250° C and treated at this temperature with an amino alcohol.

The resulting product is characterized in containing grafted amino groups, their concentration being much higher than that of free hydroxyl groups on the surface of the starting silicas. This feature enables to improve the properties of aminated silica compounds and, particularly, to increase adsorption capacity and activity thereof when said compounds are used as polymer fillers.

5 Claims, No Drawings

METHOD OF PRODUCING AMINATED SILICA COMPOUNDS

The present invention relates to disperse silica compounds having their surface chemically modified, and more particularly to a method of producing aminated silica compounds that can be used as chemically active fillers in polymers with acidic groups in macrochains, as selective adsorbents, as effective thickeners for plastic lubricants and adhesive compositions. The application of aminated silica compounds as non-swelling ion exchangers, liquid phase carriers in gas chromatography and also as cross-linking agents in epoxy resins is becoming of great importance. The use of aminated silica compounds as an inorganic matrix for immobilization of enzymes is promising as well.

A method of producing aminated silica compounds by treating silica with vapours of amino alcohols is known in the art. With this method silica is preheated at a temperature of 180°-200° C. and then is brought in contact with saturated varpours of an amino alcohol at a temperature of 50°-120° C. Concentrations of chemically grafted amino groups thus attained are much lower than those of free hydroxyl groups located on the surface of the starting silica and usually is 0.2-0.3 mmol/g $SiO_2$. The term "free hydroxyl groups" is used here to denote $\equiv$SiOH groups characterized by maximum absorption band of 3750 $cm^{-1}$ in the IR spectrum.

In said prior-art method of synthesizing aminated silica compounds the concentration of grafted amino groups is difficult to control. As a result, in some cases the required chemical and adsorption activity of the surface of the silica compound is not ensured, and the resulting aminated silica compounds often exhibit lowered hydrolytic stability.

It is an object of the present invention to modify the process of producing aminated silica compounds in such a manner as to ensure the possibility of increasing the concentration of grafted amino groups in said compounds and controlling thereof.

Said object has been accomplished in a method of producing aminated silica compounds by heating starting silica an subsequent treating thereof with amino alcohols, in which method, according to the invention, starting silica is heated at a temperature of 200°-500° C. in the absence of oxygen and moisture, and treatment with amino alcohols is conducted at temperatures from 100° to 250° C.

The method of the invention allows the obtaining of aminated silica compounds with the concentration of grafted amino groups as high as 0.8-1.2 mmol/g $SiO_2$, this being 2-3 times better than with the use of the prior-art method. Animated silica compounds produced in accordance with the method of the present invention therefore feature an enhanced adsorption capacity with respect to substances of acidic nature. Moreover, the method of the invention allows controlling the concentration of grafted amino groups. Thus, varying the temperature of heating silica within the range from 200° to 500° C., it is possible to obtain products with the concentration of grafted amino groups from 0.1 to 1.2 mmol/g $SiO_2$. With conventional methods of producing amino-organic silica compounds the attainable concentrations of amino groups do not exceed 0.2-0.3 mmol/g $SiO_2$.

Said effect is attained when the heating temperature of starting silica is within 200°-500° C. The use of temperatures above 500° C. is not expedient, since at higher temperatures there is practically no increase in the concentration of grafted amino groups, while at temperatures above 600° C. some silica specimens undergo sintering processes.

As amino alcohols use can be made of monoethanol amine, diethanol amine, triethanol amine, n-aminophenol. As silica gel, aerosils, white carbon blacks, crystalline modifications of $SiO_2$ can be employed.

The herein-proposed method of producing of producing aminated silica compounds is realized in the following manner. Disperse silica is placed into an autoclave-type reactor and heat-treated in vacuo for 2-4 hours at a temperature selected from the range of 200° to 500° C. The heating (heat treatment) period of the starting silica is selected experimentally depending on its particle size. For silica with a low specific surface it is usually sufficient to be heat-treated during 2-3 hours. For silica with a more developed specific surface heat treatment should be conducted during 3-4 hours. After such heat treatment silica is cooled down to a temperature of 100°-250° C. and aminoalcohol selected for the reaction is introduced into the reactor. The process of grafting amino groups to the silica surface is conducted for 3-4 hours at a temperature of 100° to 250° C. Then the unreacted amino alcohol is removed from the reactor by purging it with nitrogen, the reactor is cooled down to room temperature, and the target product is withdrawn.

As stated above, the present method allows the obtaining of products with the concentration of grafted amino groups much higher than that of free hydroxyls on the surface of the starting silica. A higher degree of screening of the silica surface by the grafted amino groups ensures higher hydrolytic stability of aminoorganic silica compounds. Such properties broaden the applicability of said compounds. Particularly, aminated silica compounds produced by the method of the present invention can constitute the basis for preparing filled polymer materials exhibiting high physicomechanical characteristics. It will be feasible to substantially increase the adsorption capacity of amino-organic silica compounds when using the latter as materials for adsorbing noxious admixtures or as inorganic anion exchangers. The possibility of varying the concentration of grafted amino groups allows controlling the properties of disperse media (adhesives, greases, etc.) thickened with aminated silica compounds produced by the method of the invention.

These advantageous properties of aminated silica compounds are ensured by the above-stated positive features of the present method, namely, by heating starting silica at 200°-500° C. and treating it with an amino alcohol at a temperature of 100° to 250° C., the specific reaction temperature in each particular case depending on the amino alcohol selected for the reaction.

This technological procedure proved to be novel in the light of the existing premises. These premises contend that heating silica above 200° C. has no beneficial effect on the final product. It was assumed that heating silica above 200° C. brings about a substantial reduction in the number of chemisorption centres, i.e., hydroxyl groups on the surface, so that no high concentrations of grafted amino groups can be attained. Our invention, however, allowed producing aminated silica compounds with the concentration of grafted amino groups higher than the content of free hydroxyl groups. In our opinion, this unexpected positive effect can be explained by that silicon atoms of silanol groups are coordinatively unsaturated and capable of strongly retaining water molecules. When silica is subjected to heating, the strongly retained molecules of water are desorbed from the silica surface, conditions being thus established for the formation of complexes comprising silicon atoms with hydroxyl groups, and molecules of amino alcohol. As a result, an additional amount of amino alcohol molecules is strongly retained on the silica surface. The formation of surface ethereal compounds in which silicon atom also forms a donor-acceptor bond with the amino alcohol molecule

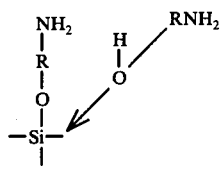

results in hindering the access to the silicon atom and, unltimately, in an increase in the hydrolytic stability of aminated silica compounds produced by the herein-proposed method.

The present method of producing aminated silica compounds is advantageous not only in the simplicity of the technological operations and easily available starting components required for producing amino-organic silica compounds; the main advantage offered by the method of the invention resides in that it allows producing the desired product with enhanced prerequisite concentrations of grafted amino groups, this feature extending possible uses of aminated silica compounds, with the ensuing positive effects attainable in other allied important processes, e.g. when using aminated silica compounds as an adsorbent having an increased adsorption capacity to such acidic admixtures as $CO_2$, $H_2S$ and the like.

For a better understanding of the present invention specific examples of its embodiment are given hereinbelow by way of illustration.

EXAMPLE 1

Fine-disperse silica (aerosil) with specific surface of 175 $m^2/g$ is charged into a reactor and heated in vacuo at 300° C. for 4 hours. The concentration of free hydroxyl groups is 0.45 mmol/g $SiO_2$. After such heat treatment silica is cooled down to 150° C. and then treated at this temperature for 4 hours with monoethanol amine taken in a five-fold excess to the silica. After that the unreacted amino alcohol is removed by purging the reactor with dry nitrogen, the reactor is cooled down to room temperature and the reaction product is withdrawn therefrom. The spectral analysis and static exchange capacity determination confirm the resultant product to be an aminated silica compound with the concentration of grafted amino groups 0.70 mmol/g $SiO_2$.

EXAMPLE 2

Fine-disperse silica (aerosil) with specific surface of 175 $m^2/g$ is charged into a reactor and heated in vacuo at 500° C. for 3 hours. The concentration of free hydroxyl groups is 0.40 mmol/g $SiO_2$. After such heat treatment silica is cooled down to 220° C. and then treated at this temperature for 2 hours with monoethanol amine taken in a five-fold excess to the silica. After that the temperature in the reactor is brought down to 150° C. the excess amino alcohol is removed from the reactor by purging it with dry nitrogen and the reactor is cooled down to room temperature. The spectral analysis and static exchange capacity determination of the resultant produkt confirm it to be an aminated silica compound with the concentration of grafted amino groups about 1.2 mmol/g $SiO_2$.

EXAMPLE 3

Silica (white carbon black) with the specific surface (for nitrogen) about 100 $m^2/g$ is charged into a reactor and heated in vacuo at 500° C. for 3 hours. Thereupon silica is cooled down to 250° C. and treated at this temperature for 3 hours with diethanol amine taken in a three-fold excess to the silica. Then the temperature in the reactor is brought down to 150° C., excess amino alcohol is removed from the reactor by purging it with dry nitrogen, and the reactor is cooled to room temperature. Static exchange capacity data for the resultant product show the concentration of grafted amino groups therein to be about 0.80 mmol/g $SiO_2$.

EXAMPLE 4

Silica (white carbon black) with the specific surface of 100 $m^2/g$ is charged into a reactor and heated in vacuo at 500° C. for 3 hours. After that silica is cooled down to 250° C. and treated at this temperature for 3 hours with n-aminophenol taken in a three-fold excess to the silica. Thereupon the temperature in the reactor is brought down to 150° C., excess amino-alcohol is removed from the reactor by purging it with dry nitrogen, and the reactor is cooled down still further to room temperature. Static exchange capacity data for the resultant product show the concentration of grafted amino groups therein to be 0.5 mmol/g $SiO_2$.

What is claimed is:

1. A method of producing aminated silica compounds, which consists essentially in the following sequence of steps: a) heating silica at a temperature of 200° to 500° C. for from 2 to 4 hours in vacuo in the absence of oxygen and moisture; b) cooling the silica down to temperatures within the range from 100° to 250° C.; and c), treating the silica with amino alcohols at a temperature from 100° to 250° C.

2. A method according to claim 1, wherein heating of the starting silica is conducted at a temperature of 300° to 500° C.

3. A method according to claim 1, wherein silica is selected from the group consisting of aerosils, white carbon blacks, silica gels and crystalline modifications of $SiO_2$.

4. A method according to claim 1, wherein amino alcohol is selected from the group consisting of monoethanol amine, diethanol amine, triethanol amine and n-aminophenol.

5. A method of producing aminated silica compounds according to claim 1 wherein the amount of the amino alcohol exceeds the concentration of the silanol groups on the silica surface by a factor of 3 to 5.

* * * * *